(12) United States Patent
Salter et al.

(10) Patent No.: US 10,035,463 B1
(45) Date of Patent: Jul. 31, 2018

(54) DOOR RETENTION SYSTEM

(71) Applicant: Ford Global Technologies, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/591,170

(22) Filed: May 10, 2017

(51) Int. Cl.
*B60R 5/04* (2006.01)
*B60Q 3/30* (2017.01)
*B60Q 3/60* (2017.01)

(52) U.S. Cl.
CPC ............. *B60R 5/04* (2013.01); *B60Q 3/30* (2017.02); *B60Q 3/60* (2017.02)

(58) Field of Classification Search
CPC ........................................................ B60R 5/04
USPC ............... 296/37.16, 218, 26.09, 26.13, 214
See application file for complete search history.

(56) References Cited

U.S. PATENT DOCUMENTS

| | | | |
|---|---|---|---|
| 2,486,859 A | 11/1949 | Meijer et al. | |
| 2,658,792 A * | 11/1953 | Scott | B60J 5/06 244/129.5 |
| 4,467,944 A * | 8/1984 | Manko | B60J 7/20 224/311 |
| 4,921,100 A * | 5/1990 | Krause | B65D 19/44 206/335 |
| 5,053,930 A | 10/1991 | Benavides | |
| 5,086,920 A * | 2/1992 | Binienda | B65D 19/44 206/335 |
| 5,193,874 A * | 3/1993 | German | B60J 7/106 206/454 |
| 5,388,391 A * | 2/1995 | Parker | B30B 9/3017 53/157 |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Dennis H Pedder
(74) *Attorney, Agent, or Firm* — Vichit Chea; Price Heneveld LLP

(57) ABSTRACT

A door retention system includes a housing defining a slot configured to accept the insertion of a door. The slot is deep enough to position a majority of the door within the slot. A sensor is positioned within the slot and configured to detect the presence of the door within the housing.

18 Claims, 5 Drawing Sheets

(56) References Cited

U.S. PATENT DOCUMENTS

| | | | |
|---|---|---|---|
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthan et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,568,659 B2 | 2/2017 | Verger et al. | |
| 9,616,812 B2 * | 4/2017 | Sawayanagi | B60Q 3/68 |
| 2002/0159741 A1 | 10/2002 | Graves et al. | |
| 2002/0163792 A1 | 11/2002 | Formoso | |
| 2003/0167668 A1 | 9/2003 | Kuks et al. | |
| 2003/0179548 A1 | 9/2003 | Becker et al. | |
| 2004/0213088 A1 | 10/2004 | Fuwausa | |
| 2004/0232092 A1 * | 11/2004 | Cash | A47B 73/008 |
| | | | 211/4 |
| 2005/0084229 A1 | 4/2005 | Babbitt et al. | |
| 2005/0189795 A1 | 9/2005 | Roessler | |
| 2005/0258200 A1 | 11/2005 | Scola | |
| 2006/0011684 A1 | 1/2006 | Wills | |
| 2006/0065688 A1 | 3/2006 | Hasz | |
| 2006/0087826 A1 | 4/2006 | Anderson, Jr. | |
| 2006/0097121 A1 | 5/2006 | Fugate | |
| 2006/0289578 A1 | 12/2006 | Beyes | |
| 2007/0032319 A1 | 2/2007 | Tufte | |
| 2007/0181624 A1 | 8/2007 | Smith | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0169291 A1 * | 7/2011 | Siethorst | B60R 7/06 |
| | | | 296/37.8 |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2017/0076567 A1 * | 3/2017 | Soldner | G08B 13/08 |
| 2017/0158125 A1 | 6/2017 | Schuett et al. | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

DOOR RETENTION SYSTEM

FIELD OF THE INVENTION

The present disclosure generally relates to vehicles having doors, and more particularly, to retention systems for vehicle doors.

BACKGROUND OF THE INVENTION

Illumination arising from the use of photoluminescent structures offers a unique and attractive viewing experience. It is therefore desired to implement such structures in automotive vehicles for various lighting applications. Further, doors may be removed from vehicles and it may be advantageous to store the doors while removed.

SUMMARY OF THE INVENTION

According to one aspect of the present disclosure, a door retention system includes a housing defining a slot configured to accept the insertion of a door. The slot is deep enough to position a majority of the door within the slot. A sensor is positioned within the slot and configured to detect the presence of the door within the housing.

According to another aspect of the present disclosure, a vehicle door retention system includes a housing defining a slot configured to accept the insertion of a vehicle door. A roller and a cushion are positioned within the slot and are configured to engage the door. A sensor is positioned within the slot and is configured to detect the presence of the door within the housing.

According to yet another aspect of the present disclosure, a vehicle includes a cargo area positioned within an interior of the vehicle. A housing defines a plurality of slots, each of the slots are configured to accept the insertion of a vehicle door. A light assembly is positioned away from the housing and configured to illuminate the slots. A sensor is positioned within each of the slots and configured to detect the presence of the doors within the housing.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
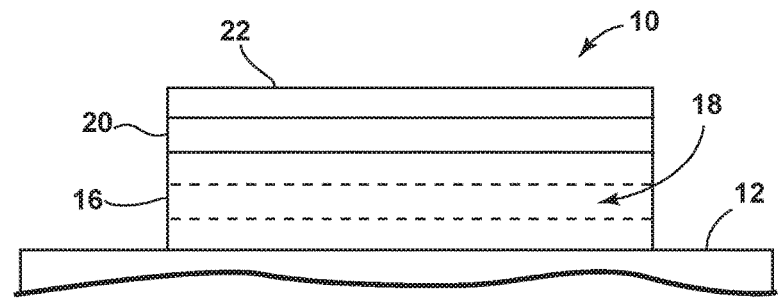
FIG. 1A is a side view of a photoluminescent structure rendered as a coating for use in an assembly according to one embodiment.
Figure 1B:
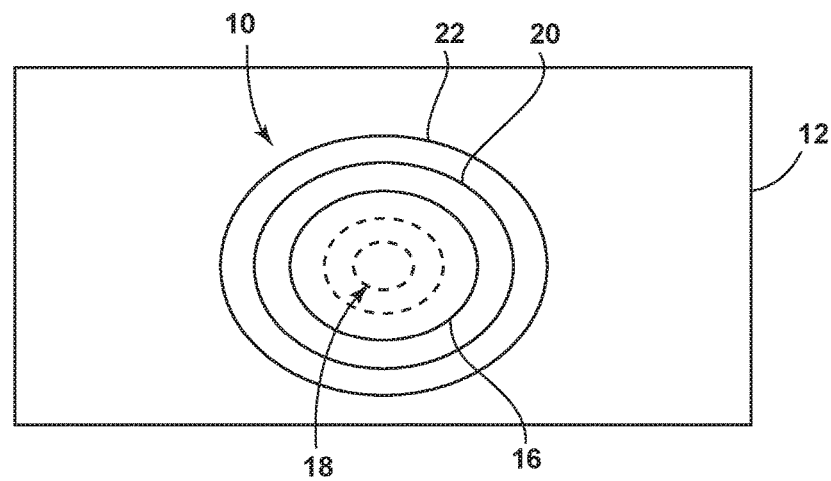
FIG. 1B is a top view of a photoluminescent structure rendered as a discrete particle according to one embodiment.
Figure 1C:
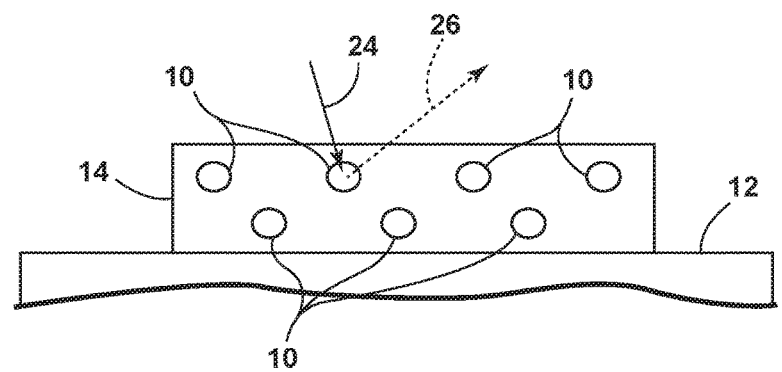
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create a red converted light 26. Moreover, the aforementioned phosphorescent materials may be combined to form a wide range of colors, including white light. It will be understood that any short persistence photoluminescent material 18 known in the art may be utilized without departing from the teachings provided herein. Additional information regarding the production of short persistence photoluminescent materials 18 is disclosed in U.S. Pat. No. 8,163,201 to Agrawal et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, Eu2+, Tb$^{3+}$ and/or Dy$^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of Mn$^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-6, reference numeral 40 generally designates a vehicle. The vehicle 40 includes a cargo area 44. A door retention system 48 is positioned within the cargo area 44. The door retention system 48 includes a housing 52 defining at least one slot 56. Each of the slots 56 are configured to accept the insertion of a vehicle door 60. According to various examples, one or more of the slots 56 are deep enough to position a majority of the doors 60 within the slots 56. A sensor 64 is positioned within the slot 56 and configured to detect the presence of the door 60 within the housing 52. A light assembly 68 may be positioned away from the housing 52 and configured to illuminate one or more of the slots 56.

Figure 2:
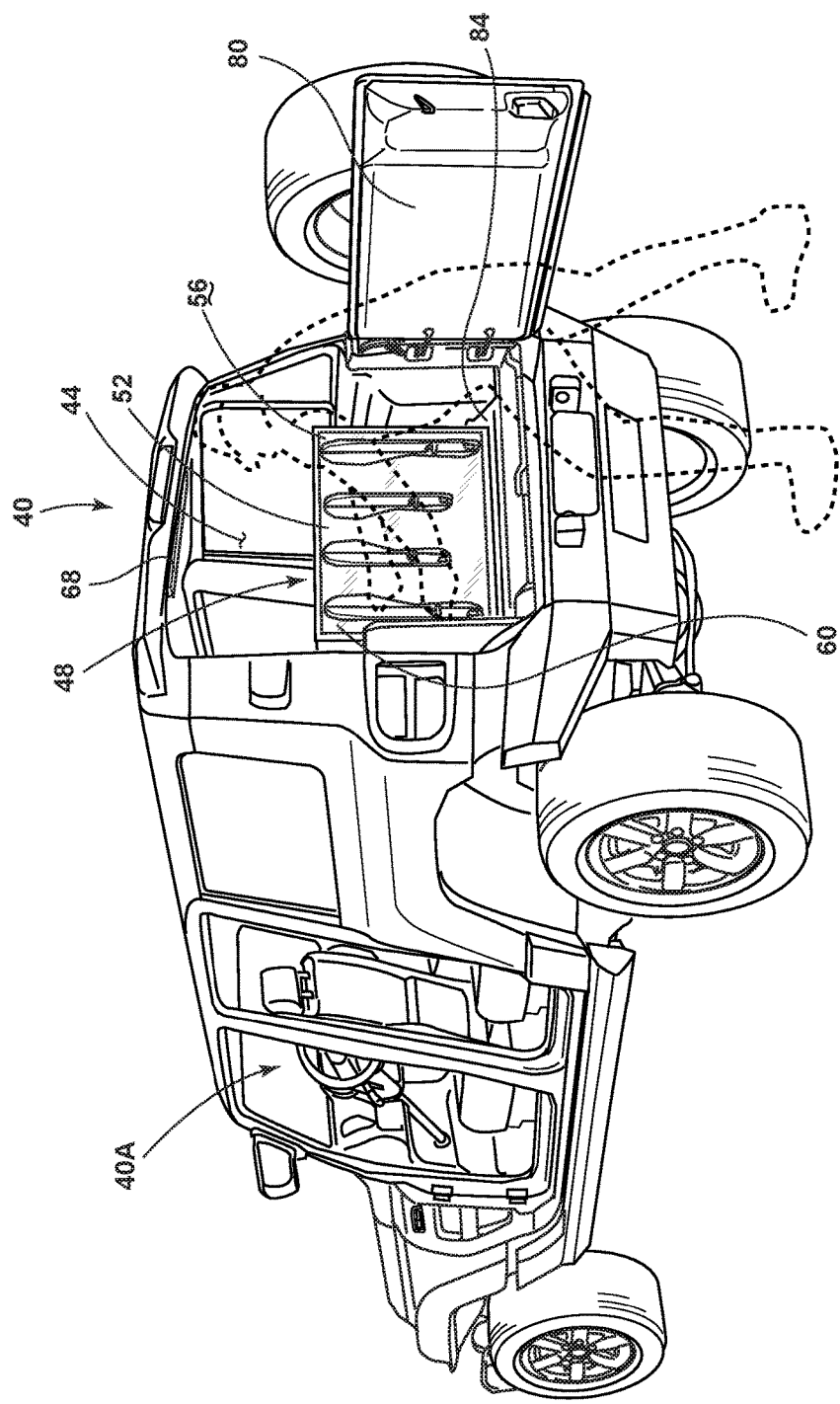
FIG. 2 is a rear perspective view of a vehicle in a "doors off" configuration, according to at least one example.

Referring now to FIG. 2, the vehicle 40 is capable of operation in a "doors on" configuration and a "doors off" configuration (FIG. 2). In the doors on configuration, the vehicle 40 includes a plurality of doors 60 (e.g., driver and passenger doors) (FIG. 3) positioned around the vehicle 40 enclosing an interior 40A, or passenger cabin, of the vehicle 40. The doors 60 are operable between a closed position and an open position. In essence, the vehicle 40 may be operated in a doors on configuration with the doors 60 attached to a frame of the vehicle 40. In the doors off configuration, one or more of the doors 60 may be removed prior to operation (e.g., driving) of the vehicle 40 such that increased ventilation and/or a desired aesthetic appeal of the vehicle 40 is achieved.

Figure 3:
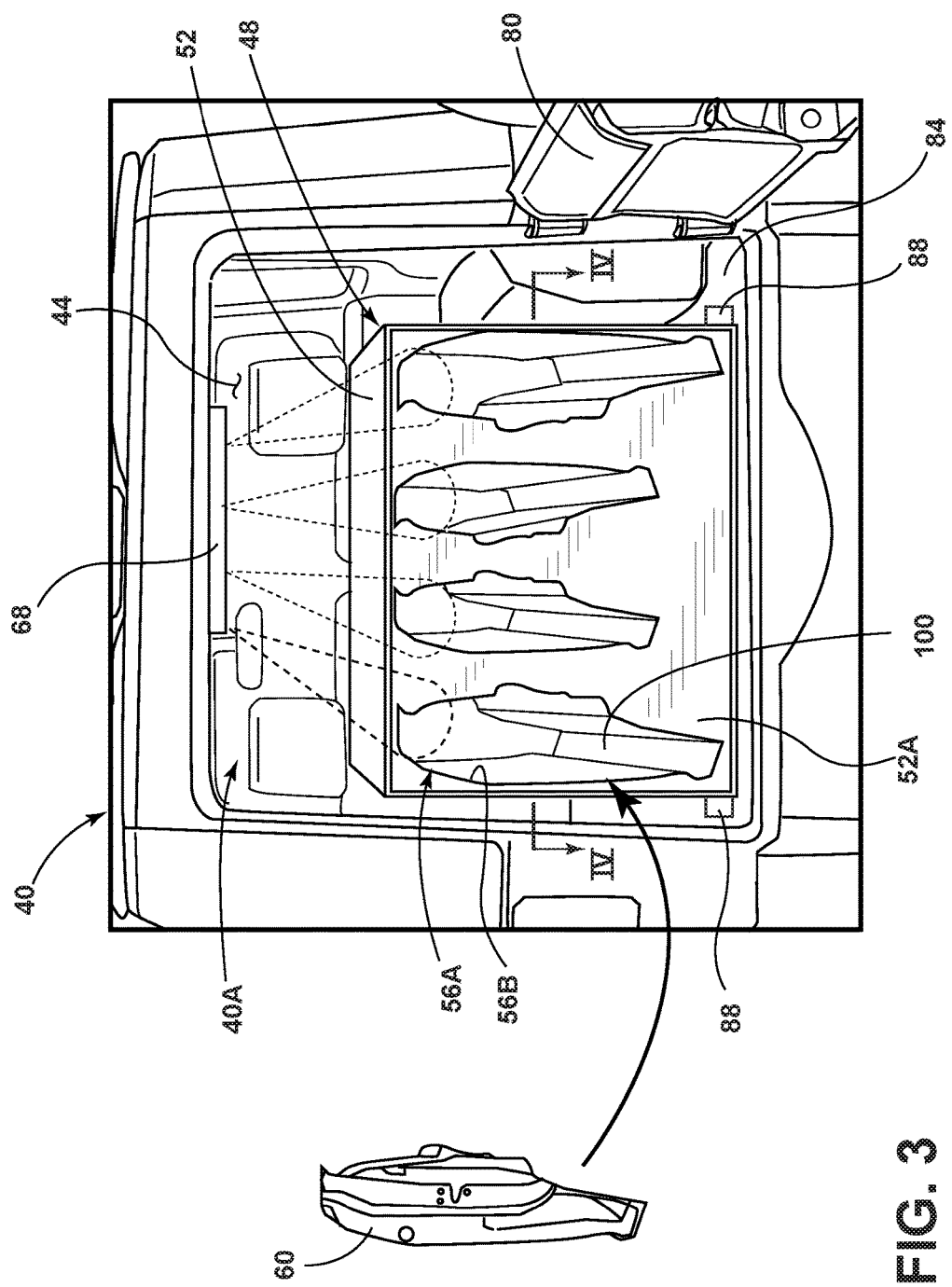
FIG. 3 is a rear elevational view of a vehicle incorporating a door retention system, according to at least one example.

Referring now to FIGS. 2-3, in the doors off configuration, the doors 60 may be stored within the door retention system 48 which is positioned in the cargo area 44 of the vehicle 40. The cargo area 44 may be positioned toward a rear of the interior cabin 40A of the vehicle 40. The cargo area 44 may be accessed through a rear door 80. The rear door 80 is operable between open and closed positions. In the open position, the rear door 80 allows the vehicle doors 60 to be moved in to and out of the cargo area 44 such that the doors 60 may be placed inside the door retention system 48. The cargo area 44 may include a cargo floor 84 on which the door retention system 48 is positioned. It will be understood that the door retention system 48 may additionally or alternatively be coupled to walls and/or a ceiling of the cargo area 44 as well as seating assemblies of the vehicle 40 without departing from the teachings provided herein. The door retention system 48 may be coupled to the cargo floor 84 via one or more attachment features 88 provided by the cargo floor 84. It will be understood that the housing 52 of the door retention system 48 may include one or more retention features configured to couple with the attachment features 88 provided by the cargo floor 84. Further, the door retention system 48 may be secured within the cargo area 44 via one or more straps which coupled with the attachment features 88 and hold the housing 52 and place (e.g., straps and/or lashings placed over a top of the housing 52). The attachment features 88 may otherwise be known as cargo tie downs. The attachment features may be integrally defined by the cargo floor 84 or may be coupled thereto in a variety of fashions.

Figure 4:
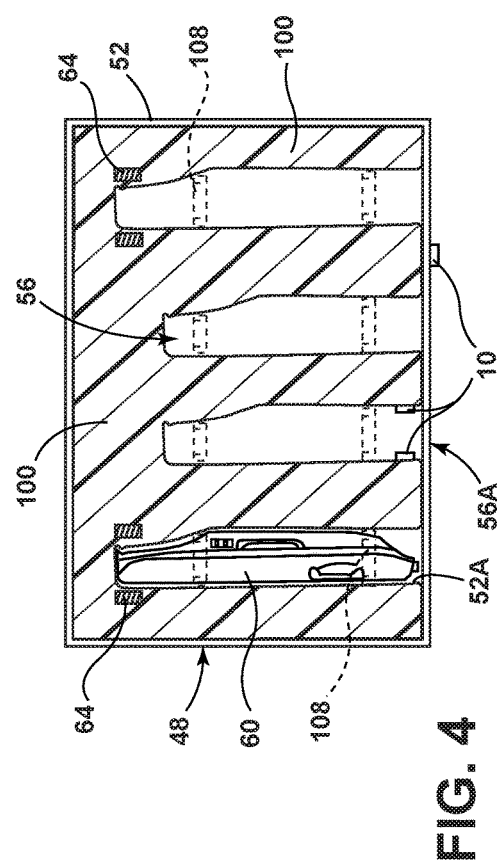
FIG. 4 is a cross-sectional view taken along line IV of FIG. 3, according to at least one example.
Figure 5:
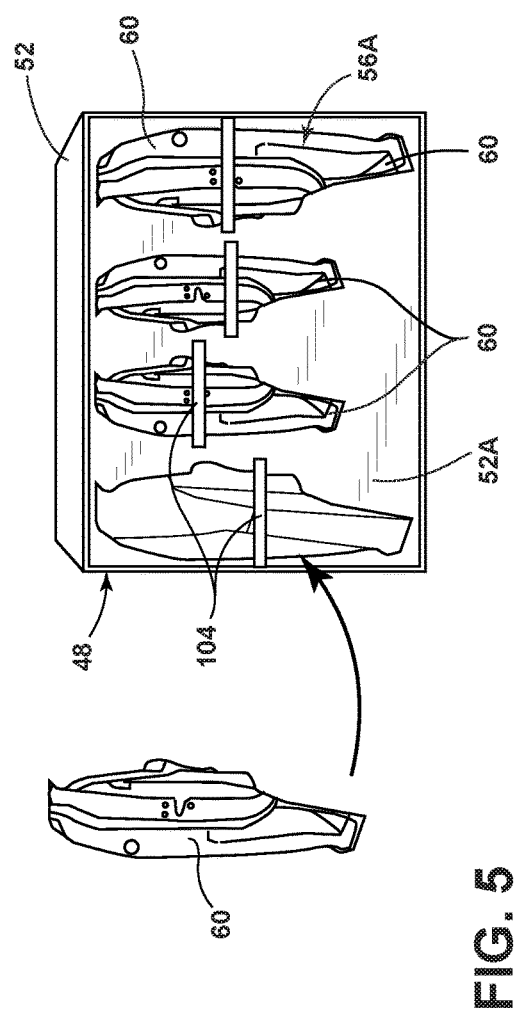
FIG. 5 is a rear elevational view of the door retention system, according to at least one example.

Referring now to FIGS. 3-5, the door retention system 48 includes the housing 52, slots 56 defined by the housing 52, the sensor 64, the light assembly 68, a cushion 100, one or more retention straps 104, one or more rollers 108 and may optionally include the photoluminescent structure 10.

As explained above, the housing 52 is positioned within the cargo area 44 of the vehicle 40. The housing 52 may alternatively be known as or referred to as, a locker. For example, the housing 52 may function as a locker for storing the vehicle doors 60. The housing 52 may be composed of a metal, a polymeric material and/or combinations thereof. It will be understood that different substrates may be composed of different materials. According to various examples, the housing 52 may be a box like structure. The housing 52 may be composed of a plurality of substrates positioned around the housing 52. The housing 52 includes a slot substrate 52A. The slot substrate 52A may be positioned on a vehicle rearward side of the housing 52 such that the slot substrate 52A is accessible when the rear door 80 is in the open position. The substrates may be a solid structure (e.g., a plate), a mesh or combinations thereof. For example, portions of the substrates may be mesh while other portions may be solid. The housing 52 may include a top substrate or the housing 52 may remain open on top (e.g., such that the doors 60 are visible within the housing 52). As will be explained in greater detail below, the housing 52 is configured to hold, or stow, the doors 60 inside. It will be understood that the housing 52 may take a variety of configurations without departing from the teachings provided herein. As will be explained in greater detail below, the housing 52 defines one or more slots 56 which are configured to accept the vehicle doors 60. Insertion of the vehicle doors 60 into the slots 56 allows the housing 52 to retain, stow or otherwise hold the vehicle doors 60. The doors 60 may be inserted into the housing 52 through openings 56A defined by the slot substrate 52A.

The slots 56 of the door retention system 48 are defined through the slot substrate 52A and into the housing 52. The slots 56 begin at the opening 56A in the slot substrate 52A and extend into the housing 52. It will be understood that the housing 52 may not include the slot substrate 52A, but instead, the housing 52 may be filled with a foam which defines the slots 56, as will be explained in greater detail below. The slots 56 include an interior surface 56B. The housing 52 may define a single slot 56 or the housing may define a plurality of slots 56. Each of the slots 56 is configured to accept a vehicle door 60. In other words, each of the slots 56 is configured to accept the insertion of a vehicle door 60 into the housing 52. The slots 56 are shaped similarly to the doors 60. For example, the slots 56 may have a cross-sectional shape which is substantially similar to that of the doors 60. In other words, an outline of a perimeter of the slots 56 may be similar to that of the door 60 such that the slot 56 defines complementary features to the door 60. Described in yet another way, the slot 56 may have a shape substantially similar to a silhouette or outside perimeter of the doors 60. As each of the doors 60 of the vehicle 40 has a different shape (e.g., front door vs. rear door) and orientation (e.g., driver side or passenger side), each of the slots 56 may have a different cross-sectional shape. In other words, the perimeter of each of the slots 56 may have a different shape. As such, each slot 56 may be designed for a specific door 60. It will be understood that in examples where each of the doors 60 of the vehicle 40 are identical, the slots 56 may likewise be identical (e.g., except for driver vs. passenger side orientation). The conforming shape of the slots 56 to the doors 60 may be advantageous in reducing a rattle of the doors 60 within the housing 52. Further, the conforming shape may be advantageous in reducing the likelihood of door misplacement (e.g., as each door 60 should only fit one slot 56) as well as reduce damage to the doors 60.

The slots 56 extend in a vehicle forward direction from the slot substrate 52A. The slots 56 have a depth, as measured from the slot substrate 52A, which is sufficient to allow insertion of the doors 60 into the housing 52. For example, the depth of the slots 56 may be such that a portion, a majority, substantially all or all of the doors 60 may be inserted into each slot 56. In other words, the doors 60 may fit fully within the slots 56. According to various examples, the slots 56 are deep enough, or extend in a vehicle forward direction far enough, that the doors 60 may be fully inserted into the housing 52. The positioning and orientation of the slots 56 within the housing 52 allows the doors 60 to be stored in an upright, or vertical, fashion while facing in a vehicle forward to vehicle rearward direction. It will be understood that in alternative examples of the housing 52 and slots 56, the doors 60 may be stored in a horizontal orientation and that the doors 60 may extend in a driver-side to passenger-side direction while stowed. Further, it will be understood that one or more light sources may be positioned within one or more of the slots 56 to illuminate the slots 56.

The photoluminescent structure 10 may be positioned in one, a plurality or all of the slots 56. The photoluminescent structure 10 may extend over a portion, majority or substantially all of the interior surface 56B. The photoluminescent structure 10 may be illuminated by the light assembly 68 as explained in greater detail below. The photoluminescent structure 10 may form one or more indicia within the slots 56 and/or proximate the openings 56A on the slot substrate 52A. The indicia formed from the photoluminescent structures 10 may include text, symbols, alphanumeric lettering and/or pictures. In examples of the photoluminescent structure 10 positioned within the slots 56, the photoluminescent structure 10 may be configured to emit light out of the openings 56A such that it is visible to a user of the door retention system 48.

The cushion 100 may be positioned in one, a plurality or all of the slots 56. The cushion 100 may extend over a portion, a majority or substantially all of the interior surface 56B. As such, the cushion 100 may define the interior surface 56B of the slots 56. The cushion 100 may be composed of a soft and/or compressible material. For example, the material of the cushion 100 may include a foam (e.g., a soft foam, a hard foam, a compressible foam, etc.), a fabric and/or other soft and/or compressible materials. In hard foam examples of the cushion 100, the foam may be composed of expanded polypropylene. In operation, the cushion 100 is configured to prevent damage from occurring to the doors 60. For example, while the vehicle 40 is in motion, the door 60 may come in contact with the interior surface 56B of the slots 56. Without the cushion 100, the doors 60 may be subject to scratching and/or marring which may produce non-aesthetically pleasing damage on the doors 60. Further, the cushion 100 is configured to deaden noise related to movement of the doors 60 within the housing 52. In other words, use of the cushion 100 may decrease rattling of the door 60 within the housing 52.

The retention straps 104 are positioned across the openings 56A defined in the slot substrate 52A. The retention straps 104 may be composed of a polymeric material, a natural material, a rubber, an elastomeric material, a fabric and/or combinations thereof. The retention straps 104 are coupled to the housing 52 and extend across the openings 56A. The retention straps 104 may include an attachment feature which is coupled to the slot substrate 52A in a variety of manners. For example, the attachment feature of the retention strap 104 may include a hook and an eyelet on the slot substrate 52A, Velcro®, magnets, other attachment mechanisms and/or combinations thereof. Additionally or alternatively, the retention strap 104 may be a hard, solid, structure which pushes the doors 60 into the slots 56 and against the cushion 100 to secure the doors 60 against rattling. It will be understood that the retention straps 104 may be coupled to the slot substrate 52A using the attachment feature on one or two sides of the slots 56. Further, a single or a plurality of retention straps 104 may extend across a plurality or all of the slots 56 without departing from the teachings provided herein. Use of the retention straps 104 may be advantageous in retaining the doors 60 within the slots 56. For example, the retention straps 104 prevent the doors 60 from migrating out of the slots 56 and potentially falling from the vehicle 40. Further, elastomeric examples of the retention straps 104, the retention straps 104 may serve to provide a biasing effect which pushes the doors 60 in a vehicle forward direction into the slots 56 and toward the sensor 64. Such a biasing effect may be known as a compression fit within the slots 56. Such biasing toward the sensor 64 may increase the likelihood of detecting the presence of the doors 60.

The sensors 64 may be positioned within and/or proximate the slots 56 and are configured to detect the presence of the doors 60. Each slot 56 may have a corresponding sensor 64, each slot 56 may have multiple sensors 64, a single sensor 64 may be configured to detect doors 60 in separate slots 56, or combinations thereof. In the depicted example, the sensors 64 are positioned proximate a vehicle forward portion of the slots 56, but it will be understood that the sensors 64 may be positioned in a variety of locations proximate the slots 56. According to at least one example, the sensors 64 are positioned proximate an end of the slot 56.

Additionally or alternatively, the sensors 64 may be positioned vehicle forward of the opening 56A. Further, it will be understood that the positioning of the sensors 64 may vary across the slots 56. In other words, each sensor 64 may be positioned in a different spot relative to its corresponding slot 56. The sensors 64 may take a variety of configurations which may detect the presence and/or absence of the doors 60. For example, the sensors 64 may include capacitive sensors, proximity sensors, magnetic sensors, electromagnetic sensors and/or combinations thereof. Further, will be understood that each of the sensors 64 may include a plurality of sensors each configured to detect a different aspect of the doors 60. According to a specific example, the sensors 64 are capacitive sensors and are configured to detect the presence of the doors 60. The sensors 64 may be electrically coupled with the vehicle 40 (e.g., to a lin bus) and configured to alert the vehicle 40 to the presence of the doors 60 within the housing 52.

One or more rollers 108 may be positioned at a bottom of the slots 56. For example, a single roller 108, two rollers 108, or greater than two rollers 108 may be positioned along the bottom of the slots 56. In a specific example, a plurality of rollers 108 are positioned at the bottom slots 56. It will be understood that the quantity and placement of rollers 108 in the slot 56 may vary from slot 56 to slot 56. Additionally or alternatively, one or more rollers 108 may be positioned along sides of the slot 56. The rollers 108 are configured to roll when in contact with the doors 60. As such, the rollers 108 may aid in sliding the doors 60 in to and out of the slots 56.

The light assembly 68 is positioned within the interior 40A of the vehicle 40. In the depicted example, the light assembly 68 is positioned within the cargo area 44. The light assembly 68 may be positioned proximate a sill on the rear door 80, on a headliner and/or a side wall of the cargo area 44. In other words, the light assembly 68 may be positioned away from the housing 52. The lights assembly 68 may include one or a plurality of light-emitting diodes (LEDs), incandescent bulbs, and/or other sources configured to emit light. According to various examples, the light assembly 68 is configured to emit light having a color corresponding to white, red, blue, green and/or combinations thereof. Additional or alternatively, the light assembly 68 may be configured to emit the excitation light 24. In such examples, the slots 56 and/or housing 52 may include the photoluminescent structure 10. The light assembly 68 may include one or more sets of optics such that light emitted from the light assembly 68 may be steered to various locations within the cargo area 44 and/or the door retention system 48. According to various examples, the light assembly 68 may be configured to illuminate one or more of the slots 56. As will be explained in greater detail below, the light assembly 68 may illuminate a specific slot 56 based on a detection of which door 60 has been removed from the vehicle 40. For example, the light assembly 68 may illuminate a desired slot 56 in a first color (e.g., green) and the other slots 56 and a second color (e.g., red). In examples where the photoluminescent structure 10 is positioned within one or more of the slots 56 and the light assemblies 68 is configured to emit the excitation light 24, the light assembly 68 may direct the excitation light 24 to the photoluminescent structure 10 such that an appropriate slot 56 for a vehicle door 60 is illuminated for a user. Further, the excitation light 24 may be configured to cause the photoluminescent structure 10 to illuminate in the colors listed above under the above noted conditions. It will be understood that the light assembly 68 may additionally or alternatively function as a dome light for the cargo area 44.

In operation, the door retention system 48 is configured to securely store the vehicle doors 60 within the housing 52. An exemplary method of operating the door retention system 48 begins with a first step of removing the doors 60 from the vehicle 40. The first step may be accomplished by disengaging hinge pins which couple hinges of the doors 60 to a frame of the vehicle 40. According to various examples, the vehicle 40 may include a sensor coupled with, or proximate to, the hinges on the door 60 to detect whether or not each of the doors 60 has been removed. Once the doors 60 are removed from the vehicle 40 a user may carry the doors to the rear of the vehicle 40.

In a second step, the light source 68 may illuminate the slot 56 corresponding to the door 60 that the user has removed from the vehicle 40. As explained above, a sensor (e.g., proximate the hinges) may detect which of the doors 60 has been removed and communicate this information to a controller or lin bus on the vehicle 40. In response, the controller or lin bus may cause the light assembly 68 to illuminate the corresponding slot 56. For example, when the front driver-side door 60 is removed, the slot 56 which is shaped like the front driver-side door 60 is illuminated. Such a feature may be advantageous and quickly alerting the user to the proper slot 56 to which the door 60 should be inserted.

In a third step, the user may align the door 60 with the slot 56 and insert the door 60 into the housing 52. Insertion of the door 60 in the slot 56 is aided by the rollers 108 which allow rolling of the door 60 into the housing 52. It will be understood that alternatively the rollers 108 may be omitted and the door 60 may simply be slid along the bottom of the slot 56. The door 60 may be slid into the housing 52 until a portion, a majority, substantially all or all of the door 60 is inside of the housing 52. Once the door 60 reaches a predetermined depth within the slot 56, the sensor 64 detects the presence of the door 60 and sends a signal to the controller or lin bus on the vehicle 40.

In a fourth step, detection of the door 60 by the sensor 64 may alter the lighting or illumination provided to the slot 56 by the light assembly 68. For example, detection that the door 60 is at the pre-described depth within the slot 56 may change the color, intensity, intermittence or other characteristic of the light emitted. Further, it will be understood that additionally or alternatively the photoluminescent structure 10 may be excited or activated in a different manner to indicate at the door 60 is that the prescribed depth within the slot 56.

In a fifth step, the user may place the retention strap 104 across the opening 56A of the slot 56 to retain the door 60 within the housing 52. As explained above, the retention strap 104 may be composed of an elastomeric or stretchable material which may provide resiliency and hold the door 60 firmly against the cushion 100 such that the rattling of the door 60 within the housing 52 is minimized.

Figure 6:
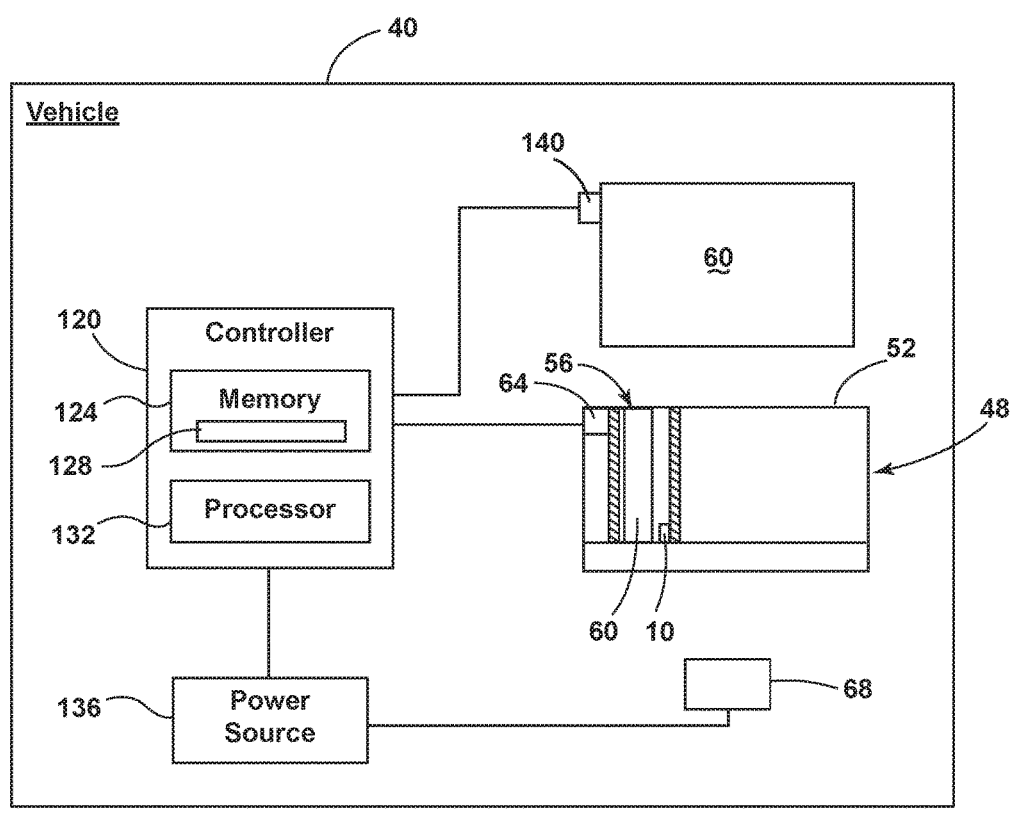
FIG. 6 is a block diagram of the vehicle and a lighting system.

Referring now to FIG. 6, the vehicle 40 includes a controller 120 which may be in communication with the door retention system 48. The controller 120 may include a memory 124 having a door retention routine 128 contained therein that is executed by a processor 132 of the controller 120. The controller 120 may provide electrical power to light assembly 68 via a power source 136 located onboard the vehicle 40. The door retention routine 128 may be configured to control a variety of aspects of the door retention system 48. The controller 120 may further be coupled to a hinge sensor 140 configured to detect the attachment of a door 60 to a frame of the vehicle 40.

In a first example, the door retention routine 128 may be configured to illuminate a specific slot 56 based on the detection of the door 60 being removed from the vehicle 40. For example, when the hinge sensors 140 detect that the driver front door 60 has been removed, the light assembly 68 may illuminate the corresponding slot 56.

In a second example, the door retention routine 128 may be configured to indicate the door 60 is secure within the housing 52. For example, the door retention routine 128 may receive data from the sensors 64 and alter the color or excitation light 24 emitted from the light assembly 68 upon detection that the door 60 is fully inserted. Further, the light assembly 68 may be configured to flash to indicate proper seating of the door 60 within the slot 56.

Use of the present disclosure may offer a variety of advantages. First, the disclosed door retention system 48 allows for the doors 60 to be stored within the vehicle 40. Second, use of the cushion 100 resists damage from occurring to the doors 60 and resist rattling of the doors 60 within the housing 52. Third, use of the door-shaped slots 56 allows the quick and easy determination of which door 60 should be placed in which slot 56. Fourth, use of the light assembly 68 further eases the user's determination of where to place the door 60. Fifth, use of the retention straps 104 decreases the chances of the doors 60 migrating out of the housing 52 and becoming damaged.

According to various embodiments, a door retention system includes a housing defining a slot configured to accept the insertion of a door. The slot is deep enough to position a majority of the door within the slot. A sensor is positioned within the slot and configured to detect the presence of the door within the housing. Embodiments of the system and/or a vehicle can include any one or a combination of the following features:

the sensor is a capacitive sensor which is configured to detect the presence of the door;
    the sensor is positioned proximate an end of the slot;
    the housing defines a plurality of slots, each slot configured to accept a door;
    the slot is deep enough to fully position the door within the slot;
    a roller positioned at a bottom of the slot;
    a plurality of rollers are positioned at the bottom of the slot;
    a retention strap coupled to the housing and extending across the slot;
    a cushion positioned within the slot;
    the slot has a cross-sectional shape substantially similar to that of the door;
    a light assembly positioned away from the housing and configured to illuminate the slot;
    a photoluminescent structure positioned within the slot;
    the housing includes a plurality of slots and each of the slots has a cross-sectional shape substantially similar to that of a different vehicle door; and/or
    the housing is positioned within the cargo area of vehicle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. Example embodiments include the following.

What is claimed is:

1. A door retention system, comprising:
   a housing defining a plurality of slots each configured to accept a door, each slot defining an open end and a closed end on opposite ends of the slot wherein the slot is deep enough to position a majority of the door within the slot; and
   a sensor positioned proximate the closed end of the slot and configured to detect the presence of the door within the housing.

2. The door retention system of claim 1, wherein the sensor is a capacitive sensor which is configured to detect the presence of the door.

3. The door retention system of claim 1, wherein the slot is deep enough to fully position the door within the slot.

4. The door retention system of claim 1, further comprising:
   a roller positioned at a bottom of the slot.

5. The door retention system of claim 1, wherein a plurality of rollers are positioned at the bottom of the slot.

6. The door retention system of claim 1, further comprising:
   a retention strap coupled to the housing and extending across the slot.

7. The door retention system of claim 1, further comprising:
   a cushion positioned within the slot.

8. The door retention system of claim 1, wherein the slot has a cross-sectional shape substantially similar to that of the door.

9. The door retention system of claim 1, further comprising:
   a light assembly positioned away from the housing and configured to illuminate the slot.

10. The door retention system of claim 1, wherein the housing is positioned within a cargo area of a vehicle.

11. A vehicle door retention system, comprising:
    a housing defining a plurality of slots each configured to accept the insertion of a vehicle door;
    a roller and a cushion positioned within each slot and configured to engage the door; and
    a sensor positioned proximate a closed end of each slot and configured to detect the presence of the door within the housing.

12. The vehicle door retention system of claim 11, further comprising:
    a light assembly positioned away from the housing and configured to illuminate one or more slots.

13. The vehicle door retention system of claim 11, wherein each slot is deep enough to fully position the door within the slot.

14. The vehicle of claim 11, further comprising:
    a photoluminescent structure positioned within at least one slot.

15. A vehicle, comprising:
    a cargo area positioned within an interior of the vehicle;
    a housing defining a plurality of slots, each of the slots configured to accept the insertion of a vehicle door;
    a light assembly positioned away from the housing and configured to illuminate the slots; and
    a sensor positioned proximate a closed end of each of the slots and configured to detect the presence of the doors within the housing.

16. The vehicle of claim 15, wherein the housing is coupled to attachment features in the cargo area.

17. The vehicle of claim 16, wherein each of the slots has a cross-sectional shape substantially similar to that of a different vehicle door.

18. The vehicle of claim 17, wherein the slot is deep enough to fully position the door within the slot.

* * * * *